Nov. 20, 1956        C. J. CARLSON        2,771,043
TRACTOR PARALLEL ROW PRODUCING GUIDE MEANS
Filed July 2, 1952        3 Sheets-Sheet 1
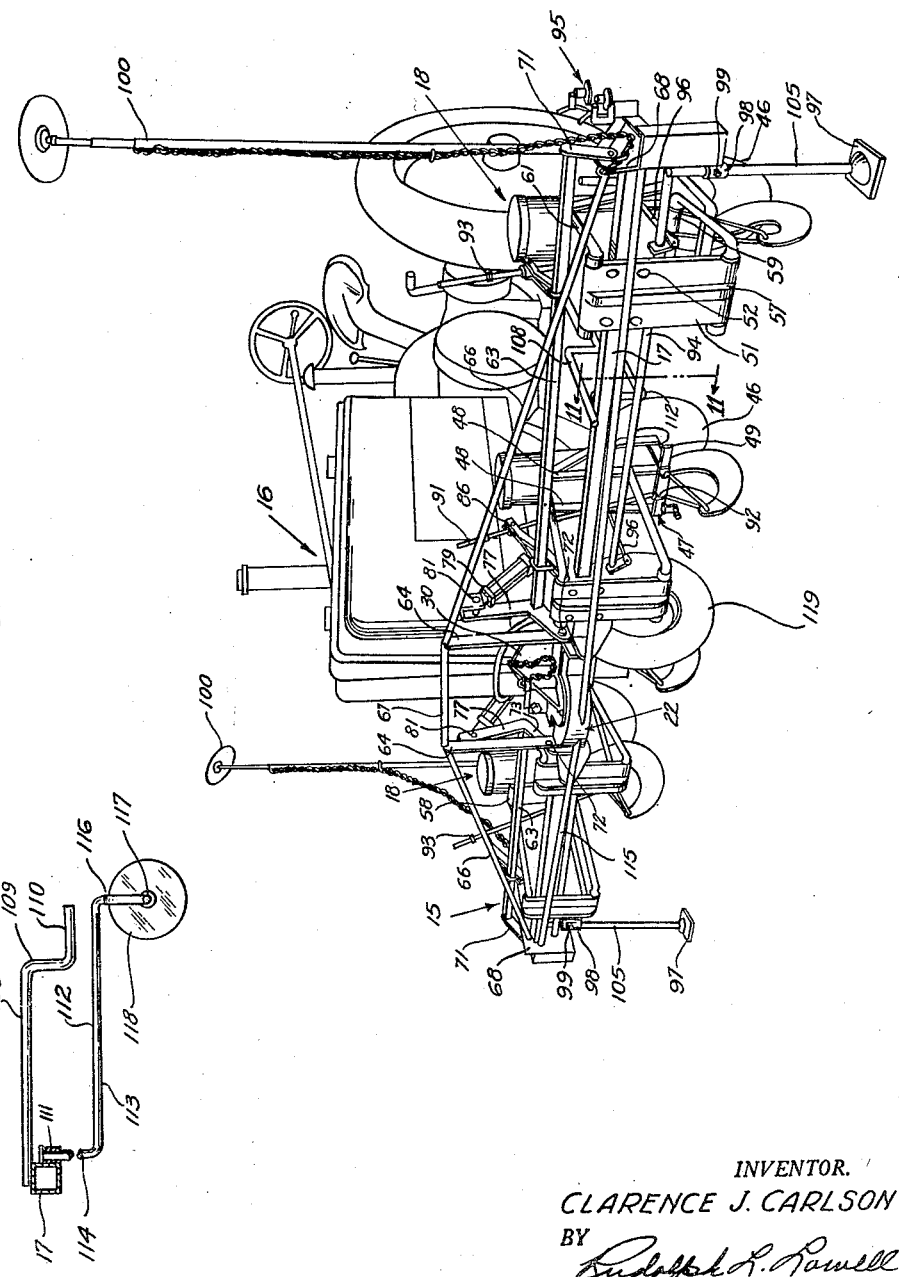
INVENTOR.
CLARENCE J. CARLSON
BY
*Rudolph L. Powell*
ATTORNEY.

Nov. 20, 1956  C. J. CARLSON  2,771,043
TRACTOR PARALLEL ROW PRODUCING GUIDE MEANS
Filed July 2, 1952  3 Sheets-Sheet 2
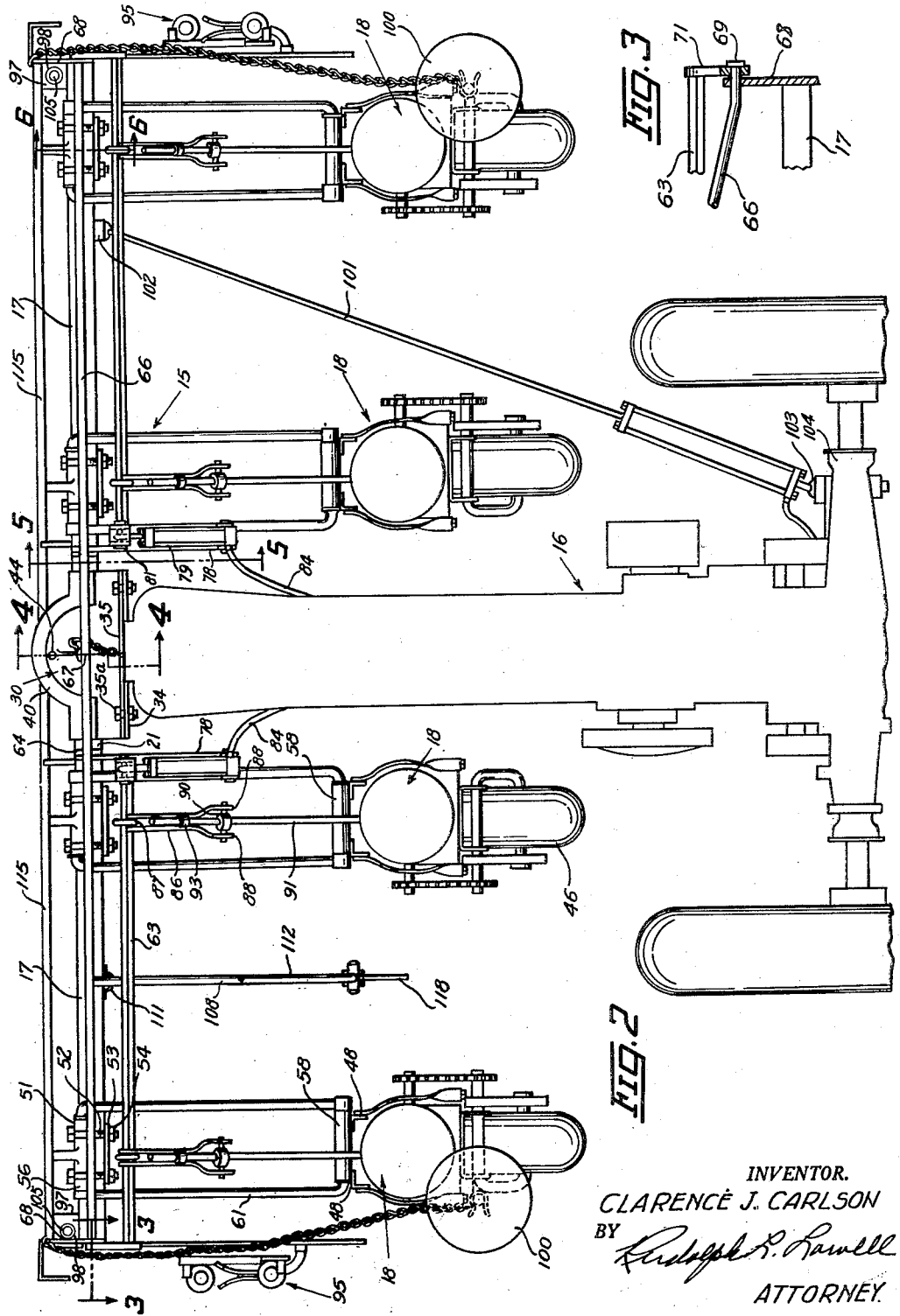
INVENTOR.
CLARENCE J. CARLSON
BY
ATTORNEY.

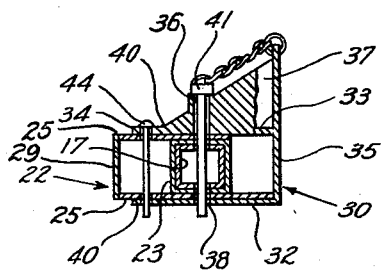
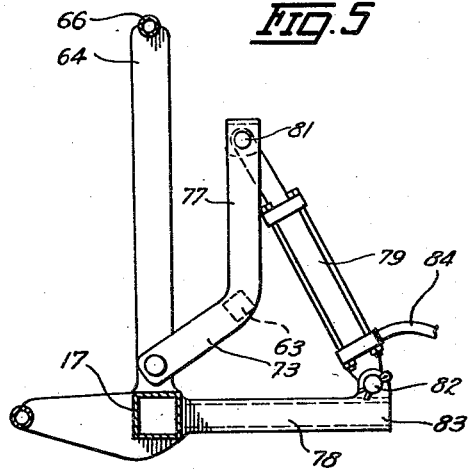
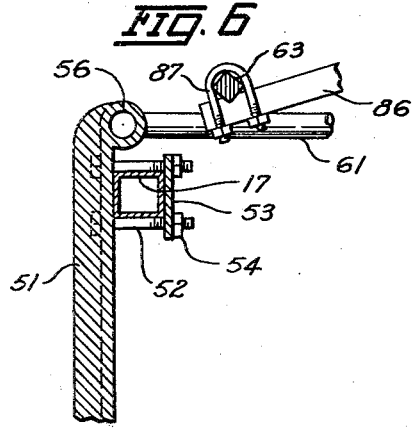
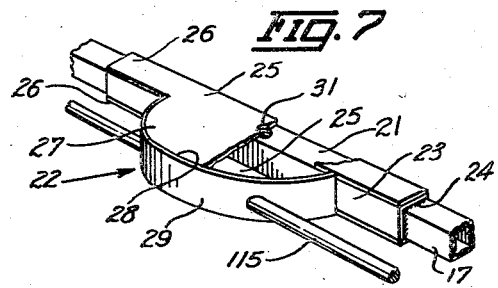
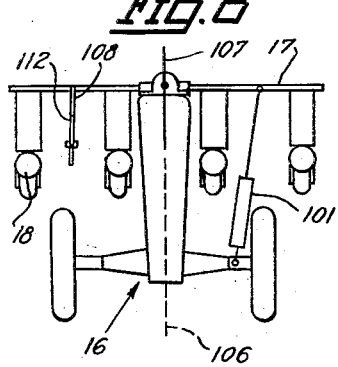
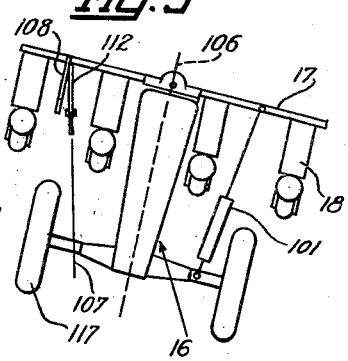
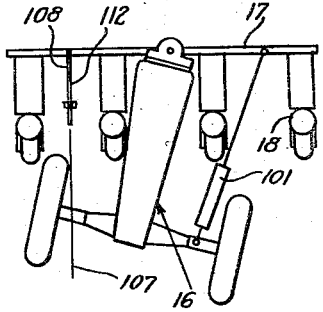

United States Patent Office 2,771,043
Patented Nov. 20, 1956

2,771,043

TRACTOR PARALLEL ROW PRODUCING GUIDE MEANS

Clarence J. Carlson, Marshalltown, Iowa

Application July 2, 1952, Serial No. 296,880

2 Claims. (Cl. 111—1)

This invention relates generally to agricultural implements and in particular to a tractor mounted planter.

An object of this invention is to provide an improved planter.

A further object of this invention is to provide a tractor mounted planter which is self-supported, when removed from the tractor, so as to be capable of being mounted on the tractor by merely driving the tractor forwardly into an assembly relation therewith.

Still another object of this invention is to provide a planter adapted to be mounted on the front end of a tractor in a transversely extended position for horizontal swinging movement to maintain straight planted rows regardless of the slope or inclination of the field being planted.

Yet another object of this invention is to provide a tractor mounted planter having a continuous rigid main frame extended transversely of the tractor, in which ground engaging planter units located rearwardly of the frame and to opposite sides of the tractor are supported from the frame for relative vertical up and down movement to maintain a uniform spacing between the rows when planting takes place in an uneven field.

A further object of this invention is to provide a tractor mounted planter, in which an elongated main frame extended transversely of the tractor and at a position forwardly thereof has planter units at its rear side arranged at opposite sides of the tractor for easy and ready observation by the tractor operator during a planting operation.

Yet another object of this invention is to provide a tractor mounted planter having an elongated continuous main frame extended transversely across the front end of the tractor, in which planter units are independently supported on the frame for adjustable movement longitudinally thereof, whereby the number of planter units used, and the spacing between the planter units, can be varied to accommodate a desired planting operation.

Still a further object of this invention is to provide a tractor mounted planter having an elongated main frame extended transversely across the front end of the tractor for horizontal swinging movement in which a visual indicating means on the frame is utilized to indicate the position of the frame relative to the line of advance of the tractor, so that the frame can be maintained normal to said line of advance even though the tractor is out of longitudinal alignment with the line of advance thereof.

Further objects, features and advantages of this invention will become apparent from the following description when taken in connection with the accompanying drawing in which:

Fig. 1 is a perspective view of the planter of this invention shown in assembly relation with a tractor;

Fig. 2 is a plan view on a larger scale of the assembly shown in Fig. 1;

Fig. 3 is a sectional detail view as seen on line 3—3 in Fig. 2;

Figs. 4, 5, and 6 are enlarged sectional detail views taken respectively along the lines 4—4, 5—5, and 6—6 in Fig. 2;

Fig. 7 is a detail perspective view of the planter-tractor mounting assembly, with parts thereof broken away to more clearly shown its construction;

Figs. 8, 9, and 10 are diagrammatic views showing changed positions between the planter and the tractor; and Fig. 11 is a sectional detail view as seen on line 11—11 in Fig. 1.

With reference to the drawings the planter of this invention, designated generally as 15, is illustrated in Figs. 1 and 2 in assembly relation with a usual farm tractor 16 equipped with an oil pump unit (not shown). The planter includes an elongated frame 17 extended transversely of the tractor 16 at a position forwardly thereof, and planter units or working tools 18 arranged rearwardly of the frame 17 to opposite sides of the tractor 16.

The frame 17 is comprised of a continuous tubular member of a square shape in transverse cross section (Figs. 1, 4, and 7) and is provided at its central portion 21 with a tractor mounting indicated generally as 22. This mounting 22 is comprised of a tubular section 23 of a size to receive the frame member 17 therethrough and is secured to the frame 17 as by welding indicated at 24. Welded to the top and bottom sides of the large tubular member 23 are a pair of plate members 25 having rear portions 26 secured to the top and bottom sides of the tube member 23 and semi-circular front portions 27 projected forwardly from the frame member 17 so that the convex surfaces 28 thereof are at the front of the frame member 17. Welded to such front surfaces 28 is a flat curved plate member 29. Aligned holes 31 extend vertically through the plate members 25, tubular member 23, and frame member 17 at positions corresponding to the radii of the semicircular portions 27. It is seen, therefore, that the plate members 25 and 29 constitute what might be termed a fifth wheel or bearing section arranged forwardly of the frame 17 for a purpose to appear later.

The front end of the tractor 16 is equipped with a planter mounting 30 (Figs. 2 and 4) which includes an upright rear plate 35 having a pair of vertically spaced, horizontally arranged, forwardly extended plates 32 and 33 rigid therewith. The mounting plate 35 is secured to a tractor bracket 34 as by bolts 35a. The plates 32 and 33 are of a shape corresponding to the shape of the plate members 25 for the tractor mounting 22 carried on the planter frame 17 except for the semi-circular portions 40 thereof being of a smaller size than the semi-circular portions 27. Projected upwardly from the top plate 33 is a tubular bearing member 36 which is suitably braced by a gusset plate 37 attached, as by welding, to the top plate 33, the bearing member 36, and the mounting plate 35. The bearing 36 is in alignment with openings 38 formed in the plates 32 and 33, and with these openings 38 being at a position corresponding to the radii of the semi-circular portions 40 of the plates 32 and 33.

As best appears in Fig. 4, the plates 32 and 33 are spaced a vertical distance apart to receive in bearing engagement therebetween the tractor mounting 22 on the frame 17. With the holes 31 in the mounting 22 arranged in registration with the tubular bearing 36, the frame 17 is supported for horizontal swinging movement on the tractor 16 by the insertion of a king pin 41 through the mountings 22 and 30.

With the mountings 22 and 30 in their assembly relation (Fig. 4) the frame member 17 is spaced forwardly of the rear mounting plate 35 so that the horizontal swinging movement of the frame 17 is limited by the engagement thereof with a side of the rear mounting plate 35. When a swinging movement of the frame 17 relative to the planter mounting 30 is not desired, the frame 17 can be locked in a transverse position, normal to the longitudinal axis of the tractor 16, by the provision of a locking pin 44 inserted through aligned openings formed in the plates 25, 32 and 33 of the mountings 22 and 30.

The planter units 18 are of a usual type and each thereof is provided with a ground engaging wheel 46. Each planter unit 18 is provided at its forward end with an upright frame structure 47 that includes a pair of upright side members 48 connected together at their lower ends by a cross member 49. Since each planter unit 18 and the assembly thereof with the planter frame 17 is the same, only one of such units and assembly will be described in detail, with like parts being designated by like numerals.

Adjustably secured to the frame 17, for movement longitudinally thereof, is an upright supporting plate 51 (Figs. 1 and 6) which extends downwardly from the frame 17. The plate 51 is secured to the frame 17 by clamping bolts 52 extended therethrough, at the top and bottom sides of the frame 17, for extension through a clamping plate 53 positioned against the rear side of the frame 17. On loosening of the nuts 54 for the clamping bolts 52, the supporting plate 51 is readily moved longitudinally of the frame 17, and is held in an adjusted position by merely tightening the nuts 54.

Carried at the upper and lower ends of the supporting plate 51 are transversely extended tubular bearing members 56 and 57, respectively, with the bearing 56 being arranged above the frame member 17. Like tubular bearing members 58 and 59 (Figs. 1 and 2) are secured in a vertically spaced relation to the front sides of the upright members 48 of a planter unit frame structure 47. A pair of longitudinally extended upper links 61 are rotatably supported in corresponding upper bearings 56 and 58, while a pair of longitudinal lower links 62 are rotatably supported in corresponding bearings 57 and 59 so as to form a parallel link system movably supporting a planter unit 18 for vertical up and down movement relative to the frame member 17.

For raising and lowering the planter units 18 into and out of ground supported positions there is provided a frame assembly which includes a pair of aligned shafts 63 arranged longitudinally of the frame 17 at positions to opposite sides of the tractor mounting 22. Secured to and extended upwardly from the frame member 17 at opposite sides of the tractor mounting 22 are a pair of combination support and brace members 64. A tie rod 66 has the central portion 67 thereof secured to the upper ends of the combination members 64 and the opposite ends thereof extended through upright supporting plates 68 which are rigidly attached, as by welding, to the ends of the frame members 17 (Figs. 1 and 3). A second brace or tie rod, 115 (Figs. 1 and 2) is extended longitudinally of the frame 17, at a position forwardly thereof, and has its outer ends secured to the end plates 68, and the inner ends thereof fixed to the tractor mounting 22.

Rotatably mounted on each projected end 69 of the tie rod 66 is a rock arm 71 (Fig. 3). Pivotally supported at 72, adjacent the lower ends of the upright combination members 64 are rock arms 73. Each shaft 63 extends between and is secured, as by welding, to a corresponding pair of rock arms 71 and 73. The rock arms 71 and 73 are normally extended upwardly and rearwardly from the frame member 17 so that the shafts 63 are arranged rearwardly of the frame 17. Extended upwardly from the rock arms 73 are corresponding lever arms 77, with each lever arm 77 being formed integral with the corresponding rock arm 73 so as to form an arm assembly. Projected rearwardly from the frame 17, at positions below the rock arms 73 (Figs. 2 and 5) are supporting arms 78 which terminate at positions rearwardly of the rock arms 73. Hydraulic cylinder assemblies 79 have one end pivotally attached at 81 to the free or upper end of a lever arm 77 and its other end pivotally connected at 82 to the rear end 83 of a supporting arm 78. Oil under pressure is supplied to a cylinder assembly 79 from the tractor oil pump unit (not shown) through a supply line 84.

Arms 86 (Figs. 2 and 6) corresponding in number to the planter units 18, are attached to the shafts 63 by U-clamps 87, so that on release of a clamp 87, an arm 86 is adjustably movable longitudinally of a shaft 63. The arms 86 are inclined upwardly and rearwardly from a shaft 63 and have their free or rear ends 88 of a forked or bifurcated construction. Positioned between and rotatably supported in the bifurcations 88 is a trunnion unit 90. Extended through the trunnion 90 is a lift rod 91 the lower end of which is pivotally attached at 92 (Fig. 1) to the cross brace 49 of the planter frame structure 47. The upper end of a lift rod 91 adjustably carries a stop nut 93 for engaging a corresponding trunnion 90.

Thus, with the planter units 18 in ground engaging positions, the units are independently supported for relative vertical up and down movement in response to the terrain conditions encountered by the ground wheels 46. To raise the planter units 18 out of ground engaging positions, oil under pressure is supplied to the hydraulic cylinder assemblies 79. On extension of the cylinder assemblies 79 the shafts 63 are rocked upwardly and forwardly to in turn provide for an upward and forward movement of the rock arms 86. On engagement of the trunnion units 90 with corresponding stop nuts 93 on the lift rods 91, the planter units 18 are concurrently elevated. To lower the planter units 18 to their ground engaging positions, oil under pressure is released from the hydraulic assemblies 79 whereby the planter units 18 are lowered in response to the action of gravity.

In this respect it is to be noted that the stop nuts 93 are normally spaced above the trunnion units 90 to permit a free up and down relative movement between the planter units 18, when the planter is in operation. In such operation the frame 17 has provided at each end thereof a conventional check wire receiving mechanism 95 which is operatively associated, in a well known manner, with a trip shaft 94 (Fig. 1) arranged below the frame 17 and suitably connected, also in a well known manner, with trip rods 96, corresponding in number to the planter units 18, for selectively actuating the same. The specific construction and connection of the mechanism 95, trip shaft 94 and trip rods 96 form no part of this invention and are not, therefore, described in detail. Also, the outside planter units carry usual ground markers 100.

In the use of the planter 15 of this invention let it be assumed that the planter is removed from the tractor 16 and is to be mounted thereon. As previously described each planter unit 18 is independently supported from the frame 17 for vertical up and down movement and with the downward movement, when the shafts 63 are in their lowered positions, being limited by the ground support of the planter unit wheels 46. To provide for the self-support of the planter 15, independently of the tractor 16, each end of the frame 17 is adapted to carry a vertically adjustable leg or standard 105 (Fig. 1) having a base 97. The upper end of each leg 105 is loosely received within an upright collar or tube member 98 which is fastened, as by welding, to an end plate 68 on the frame 17. A leg 105 is held in an adjusted position by a usual friction screw 99 threadably supported in a collar 98 for frictional clamping engagement with a leg 105.

The vertical adjustment of the legs 105 is such that the planter 15 is supported in a position, corresponding to the position thereof when mounted on the tractor 16, so that the tractor mount 22 on the frame 17 is horizontally disposed at a vertical level opposite the space between the plates 32 and 33 of the planter mount 30 carried at the front end of the tractor 16. With the frame 17 of the planter 15 thus supported the tractor 16 is driven forwardly between the inner pair of planter units 18 until the tractor mount 22 is received between the plates 32 and 33 of the planter mount or cooperating section 30 on the tractor at a position to provide for the insertion of the king pin 41. The legs 105 are then removed from the frame 17. It will be apparent that in order to remove the planter from the tractor 16, the procedure for its mounting on the tractor is merely reversed.

Thus, it is seen that the planter 15 is assembled with and removed from the tractor 16 as a complete unit by only the insertion and removal of the king pin 41, and by virtue of the self-support of the planter in a normal operating or mounting position providing for the assembly of the mounts 22 and 30 by relative horizontal movement therebetween, the operation can be easily and quickly performed by one man.

When planting is to be done in a substantially level field having what might be termed the usual depressions, or high or low spots therein, the locking pin 44 (Figs. 2 and 4) is inserted through the mounts 22 and 30 to lock the frame 17 against horizontal swinging movement in a transverse plane normal to the longitudinal axis of the tractor. With the shafts 63 in their lowered positions, the planter is operated in a usual manner, in conjunction with a check wire (not shown). By virtue of the individual support of each of the planter units 18, for vertical up and down movement relative to the planter frame 17, it will be seen that straight and parallel planted rows are positively maintained, regardless of any relative up and down movement between the planter units 18. In other words, when the planter units are connected, as is now usually done in practice in a gang or in sections, such that the up and down movement of one planter unit is transmitted to one or more other planter units, the units tend to be swung laterally out of upright positions therefor so as to vary not only the spacing between adjacent planted rows, but to effect waves or bends in the rows.

Now, let it be assumed that the planting operation is to take place on a field which is sloped or inclined. In this kind of planting it is well known that the tractor rear wheels tend to ride below the tractor front wheels so that the longitudinal axis of the tractor is inclined relative to its line of advance. The tractor thus travels what might be termed "dog fashion," in that it is inclined at an angle relative to its line of advance.

In this type of planting, the locking pin 44 is removed from the mounts 22 and 30 so as to provide for a horizontal swinging movement of the frame 17. This swinging movement is controlled by a double acting hydraulic cylinder assembly 101 (Fig. 2) extended horizontally with one end thereof pivotally connected at 102 adjacent an end of the frame 17, and having its other end pivotally connected at 103 to the tractor rear axle 104. In one embodiment of the invention the frame 17 is about eleven feet long, and the cylinder assembly 101 provides for a swinging movement of the frame 17, each side of a transversely extended position therefore, of about twelve inches, and with this movement being permitted by virtue of the spaced relation of the frame 17 with the rear mounting plate 35 of the planter mounting 30, as best appears in Fig. 4.

Oil under pressure is supplied to the assembly 101 from the tractor oil pump unit (not shown) and this assembly 101 is controlled to maintain the frame 17 extended transversely of, or normal to the tractor line of advance indicated in a full line at 107 in Fig. 8.

In order to visually determine the relative position between the frame 17 and the line of advance 107 of the tractor 16, there is provided a visual indicating means which includes a longitudinal indicating member rigidly secured to the frame 17 (Figs. 1 and 2) and extended rearwardly from the frame 17. Stated otherwise, the indicating member 108 projects rearwardly from the frame 17 and perpendicular to the frame 17.

The indicating member 108 is secured to the top side of the frame 17 (Fig. 11) and is formed with a downwardly extended upright section 109 that terminates in a longitudinal rearwardly projected extension 110. Immediately below the member 108 and in vertical alignment therewith is an upright tubular bearing member 111 which is welded to the rear side of the frame 17. Rotatably carried in the bearing 111 is a movable indicating member 112 which is comprised of a bar member having a longitudinally extended central section 113 and an upturned front section 114 which is carried in the bearing 111. The body member 113 terminates in a downwardly extended rear section 116 upon which there is rotatably supported at 117 a flat ground engaging disc 118. It is contemplated that the extension 110 on the fixed indicator 108 be about two inches above the central section 113 of the movable indicator 112.

By virtue of the rotatable support of the movable indicator 112 on the frame 17 and the engagement of the disc 118 with the ground, the movement of the indicator 112 relative to the frame 17 will take place in response to the movement of the tractor longitudinal axis 106 shown in dotted lines in Fig. 8, out of alignment with the tractor line of advance 107. In other words, the member 112 will always indicate the tractor line of advance 107, regardless of the inclination of the tractor longitudinal axis 106 relative to the tractor line of advance 107. Since this movement of the movable indicator 112 takes place relative to the rigid indicator 108, it will be seen that when the indicating members 108 and 112 are maintained in vertical alignment, that the frame 17 is maintained in a plane normal to the line of advance 107 of the tractor 16. This alignment is readily observed as a result of the proximity of the extension 110 on the indicator 108 to the section 113 of the indicator 112.

Thus, with reference to Fig. 8, where the tractor longitudinal axis 106 and the tractor line of advance 107 are shown in vertical alignment, the frame 17 is in a plane normal to both thereof. However, with the tractor 16 traveling on a slope, inclined upwardly from the left side thereof, the longitudinal axis 106 of the tractor 16 is moved out of alignment relative to the tractor line of advance 107 by virtue of the tendency of the rear end of the tractor 16 to slip downwardly of the inclined slope, out of a direct trailing or following relation with the tractor front wheel, shown at 119 in Fig. 1. With the frame 17 maintained normal to the longitudinal axis 106, as shown in Fig. 9, it is seen that the planter units 18 are also moved relative to the tractor line of advance to effect what might be termed a "wave" in the planted row out of a straight line. This position of the frame 17 relative to the line of advance 107 is visually indicated by the movement of the movable indicator 112 out of a vertically aligned relation with the rigid or stationary indicator 108.

By actuating the cylinder assembly 101 to swing the frame 17 from its position shown in Fig. 9, to its position shown in Fig. 10, the frame 17 is moved relative to the tractor into a plane normal to the tractor line of advance 107, which will be indicated by the vertical alignment of the indicating members 108 and 112. As a result, the planted rows are maintained straight and evenly spaced so as to eliminate any waves or deflections therein. It will further be noted that the vertical up and down movement of the planter units 18 is maintained so as to further avoid any deflections in the planted rows out of a straight line arising from any lateral or transverse swinging movement of the planter units 18.

Also, the cylinder assembly 101 can be actuated to swing the planter 15 in the direction of turn of the tractor 16, to facilitate the steering of the tractor in contour farming concurrently with maintaining an even spacing between the planted rows.

From the above description it is seen that this invention provides a tractor mounted planter which is of a compact and simple construction, and which is conveniently and easily assembled with, and removed from a tractor, with a minimum of manual effort and by one man. Further, the machine is efficient in operation to maintain straight, uniformly spaced rows, in the travel of the planter over either an uneven terrain, or on a sloped or inclined field.

Although the invention has been described with respect to a preferred embodiment thereof it is to be understood that it is not to be so limited since changes can be made therein which are within the full intended scope of this invention as defined by the appended claims.

I claim:

1. In combination with a tractor, an implement attachment including a main frame extended transversely of the tractor and pivotally supported on the front end of the tractor for swinging movement in a plane substantially parallel to the ground travelled by the tractor, a first indicator member fixed on said frame and having a rearwardly extended portion arranged normal to the frame, a second indicator member pivotally mounted on said frame for horizontal swinging movement about a vertical axis, said second indicator member including a first portion extended transversely of the frame and arranged in a plane substantially parallel thereto and a second portion for engaging the ground to maintain said second indicator member parallel to the path of travel of the tractor, and means for moving said frame relative to said tractor to maintain said rearwardly extended portion and said transverse portion in vertical alignment.

2. In combination with a tractor, an implement attachment including a main frame extended transversely of the tractor and pivotally supported on the front end of the tractor for swinging movement in a plane substantially parallel to the ground travelled by the tractor, means connected to and extended between said tractor and said main frame for swinging said frame relative to said tractor, and indicator means on said main frame for visually indicating the amount of movement of said main frame required to position said main frame substantially perpendicular to the line of travel of said tractor when said tractor travels over sloping ground and is steered to overcome the tendency of the rear end thereof to slip downwardly on said sloping ground.

References Cited in the file of this patent

UNITED STATES PATENTS

| | | |
|---|---|---|
| 1,383,409 | Liddell | July 5, 1921 |
| 1,861,731 | Wooldridge | June 7, 1932 |
| 1,891,488 | White | Dec. 20, 1932 |
| 1,906,431 | Strehlow | May 2, 1933 |
| 1,936,749 | Cady et al. | Nov. 28, 1933 |
| 2,075,482 | Thorpe | Mar. 30, 1937 |
| 2,111,453 | Lange | Mar. 15, 1938 |
| 2,115,387 | Graham et al. | Apr. 26, 1938 |
| 2,160,595 | LeBleu | May 30, 1939 |
| 2,337,662 | Johnson | Dec. 28, 1943 |
| 2,338,632 | Frazier | Jan. 4, 1944 |
| 2,398,972 | Smith | Apr. 23, 1946 |
| 2,423,148 | Johnson | July 1, 1947 |
| 2,584,217 | Morkoski | Feb. 5, 1952 |